(12) United States Patent
Strong

(10) Patent No.: US 7,059,570 B2
(45) Date of Patent: Jun. 13, 2006

(54) AERIAL DELIVERY DEVICE

(76) Inventor: Edward Strong, 6659 Lake Cane Dr., Orlando, FL (US) 32819

( * ) Notice: Subject to any disclaimer, the term of this patent is extended or adjusted under 35 U.S.C. 154(b) by 0 days.

(21) Appl. No.: 10/709,186

(22) Filed: Apr. 20, 2004

(65) Prior Publication Data

US 2005/0230555 A1    Oct. 20, 2005

(51) Int. Cl.
 *B64D 17/48* (2006.01)
(52) U.S. Cl. ..................................... 244/147
(58) Field of Classification Search .............. 244/142, 244/139, 149, 147, 138 R
See application file for complete search history.

(56) References Cited

U.S. PATENT DOCUMENTS

| | | | |
|---|---|---|---|
| 2,545,248 A * | 3/1951 | Winzen et al. .......... 244/138 R |
| 2,593,427 A | 4/1952 | Fill | |
| 3,315,921 A | 4/1967 | Riley et al. | |
| 3,433,441 A * | 3/1969 | Cummings .............. 244/138 R |
| 4,175,722 A | 11/1979 | Higgins | |
| 4,440,366 A * | 4/1984 | Keeler et al. ........... 244/138 R |
| 4,662,589 A * | 5/1987 | Allen et al. .................. 244/142 |
| 5,186,418 A | 2/1993 | Lauritsen | |
| 5,201,482 A | 4/1993 | Ream | |
| 5,398,891 A | 3/1995 | Azim et al. | |
| 5,678,788 A * | 10/1997 | Hetzer et al. ............... 244/152 |
| 5,899,415 A * | 5/1999 | Conway et al. ............. 244/152 |
| 6,505,793 B1 * | 1/2003 | Schwarzler .................. 244/142 |
| 6,622,968 B1 * | 9/2003 | St. Clair et al. ........ 244/138 R |
| 6,808,144 B1 * | 10/2004 | Nicolai et al. .............. 244/139 |
| 6,889,942 B1 * | 5/2005 | Preston ....................... 244/152 |
| 2002/0070315 A1 * | 6/2002 | Hilliard et al. ............. 244/139 |

* cited by examiner

*Primary Examiner*—Tien Dinh
(74) *Attorney, Agent, or Firm*—Malin, Haley & DiMaggio, P.A.

(57) ABSTRACT

A guided aerial delivery device which can be used to safely and accurately deliver a payload and supplies from an aircraft in flight to a specific target location in a reduced time. The aerial delivery device uses an overloaded ram-air drogue parachute controlled by a guidance system to steer the payload towards the intended target. When a selected altitude is reached, a recovery parachute is activated and the payload descends the remaining distance under the recovery parachute.

20 Claims, 12 Drawing Sheets

AERIAL DELIVERY DEVICE

BACKGROUND OF INVENTION

1. Field of the Invention

The present invention relates generally to aerial delivery devices and more specifically to guided aerial delivery devices which may be used to deliver payload and supplies to an intended target.

2. Description of Related Art

Aerial delivery devices are often used in the military to deliver vital equipment and supplies from flying planes to specific ground targets. Typically a plane will fly overhead of the intended ground target and the supplies or equipment will be dropped from the plane with an attached parachute which opens and ensures a safe landing of the supplies and equipment. The supplies once deployed are subject to drift due to wind and may also encounter enemy fire causing failure of delivery. The accuracy and success of delivery can sometimes be increased by taking into consideration the effects of airplane and wind velocity vectors, but changes in wind direction often cause deliveries to drift off into unintended areas and enemy hands. To further increase the accuracy of aerial deliveries airplanes may fly at lower altitudes so that the potential for drift is reduced—this increases the risk of exposure to enemy anti-aircraft fire. What is needed in the art is an aerial delivery device that provides accurate delivery of the payload from a high altitude while remaining in the air for a reduced amount of time. What is needed is a device that provides delivery of a payload with a reduced time in the air, allowing the deployment of a recovery parachute at high enough altitude to provide a soft landing for the payload.

It is therefore, to the effective resolution of these problems and shortcomings that the present invention is directed.

SUMMARY OF INVENTION

A remote controlled aerial delivery device which uses an overloaded ram-air drogue parachute to safely and accurately direct the payload and supplies from an aircraft in flight to a specific target location at an increased speed, at a selected altitude a recovery parachute is deployed and the payload descends the remainder of the distance under the round recovery parachute. In the preferred embodiment, the aerial delivery device generally comprises a ram-air drogue parachute, a stabilization bar, a control box, one or more recovery parachute(s) and payload support straps. The recovery parachute(s) are preferably attached to one point of a polygonal link and payload support straps are attached to a second point of the polygonal link. The ram-air drogue parachute, recovery parachute(s) and payload are all independently attached to the link. The link is preferably triangular. In an alternative embodiment, a suspension plate may be attached to, or be a part of, the control box.

In use, the ram-air drogue parachute is attached to the stabilization "control" bar and recovery parachute(s) are attached to payload support straps. The cargo sought to be delivered is suspended from the suspension plate via payload straps. Upon exiting the aircraft the cargo is held in a stable attitude during ram-air drogue flight drogue-fall descent by the ram-air drogue parachute. The ram-air drogue parachute is a small, highly maneuvearable/steerable ram-air gliding type canopy similar to those already in existence but relatively smaller in size that normally used for the, as compared to the normal suspended weights, and thus overloaded. The ram-air drogue parachute is deployed automatically by a static line as the aerial delivery device leaves the aircraft. By using an overloaded ram-air drogue parachute the terminal velocity of the descending device and payload is slightly reduced. The size of the ram-air drogue parachute is dependent upon the performance desired—as the overloading of the ram-air drogue parachute is increased the terminal velocity of the descending payload and device increases thereby reducing the time that the payload spends in the air. Also, the forward speed of the payload is greatly increased over standard ram-air parachute delivery speeds.

Control lines associated with the ram-air drogue parachute allow a control system enclosed within the control box to maneuver/steer the payload towards the intended target as it descends. The control system generally consists of a remote control system including rechargablerechargeable batteries, servo motors and gearboxes, a three channel remote control, and a three channel remote receiver.

In a first embodiment, steering of the ram-air canopy can be accomplished through the use of only a single servo. At the servo is can be a gear box and a spool. The middle of the control line can be wrapped around the spool so that one. One end of the line goes can go up the left side of the canopy and the other up to the right control line. The spool is rotated wound one way to turn the canopy that direction. The line is then, unwound and can continue to be wound in the opposite direction to turn in the opposite direction.

In another embodiment, first and second control lines are reeled in and out by spools that are attached to the servo motors. Preferably the two servo motors are high torque permanent magnet DC type which allow six to eight full revolutions and which are coupled to planetary gearheads to provide the needed power. The winch spool attached to the output shaft of each gearhead meters the canopies lower control lines in and out providing precision control. The remote receiver constantly monitors radio signals transmitted by the remote control and adjusts the position of the control lines via the one or more servo motors according to those signals sent by the remote control so that the cargo is steered towards its target while descending by the operation of the remote control.

When a specified parachute opening altitude is reached, the recovery parachute is deployed by (a) a radio signal from a transmitter; (b) independent automatic activation device (AAD) or (c) by GPS recognition of altitude. Alternatively, the ram-air drogue parachute is attached to the recovery parachute via an extraction bridle, and the recovery parachute is deployed by the release of the ram-air drogue parachute by an AAD or cutter. Once the recovery parachute is deployed the ram-air drogue parachute is fully collapsed thereby reducing drag so that recovery parachute performance is not hindered. The recovery parachute is preferably the large round traditional recovery parachute type used for delivery of a payload. The size of the canopy of the recovery parachute can range from several hundred to several thousand square feet depending on the total cargo weight and performance requirements. The payload descends the remainder of the distance under the recovery parachute.

The aerial delivery device may be dropped from as high as approximately thirty-five thousand feet, while being able to navigate and land within twenty meters of the intended target area dependant upon the general accuracy of deployment of the recovery parachute(s). Additionally, the aerial delivery device is reusable and can successfully accommodate a wide variety of payload weights.

In another embodiment the control system consists of a programmable global positioning guidance system, rechargeable batteries and one or more servo motors. The programmable global positioning system is programmed with the intended target by the user. The first and second control lines associated with the ram-air drogue parachute are reeled in and out by spools that are attached to the single servo motor or servo motors. Preferably the two servo motors are high torque permanent magnet DC type which allow six to eight full revolutions and which are coupled to planetary gearheads to provide the needed power. The winch spool attached to the output shaft of each gearhead meters the canopy's lower control lines in and out providing precision control. The programmable global positioning guidance system constantly monitors the position and direction of the device and adjusts the position of the control lines via the servo motors so that the device and attached payload is steered towards the intended target.

The precise altitude and over ground position or point can be preselected by considering variables including: wind direction, velocity, and recovery parachute(s) opening time and the rate of descent with a given cargo weight. The point can be a series of points rising in altitude and distance from intended recovery parachute opening point upwards into the wind, depending upon the trajectory of the descending ram-air drogue parachute and payload.

The instant invention will now be described with particular reference to the accompanying drawings.

DETAILED DESCRIPTION

Figure 1:
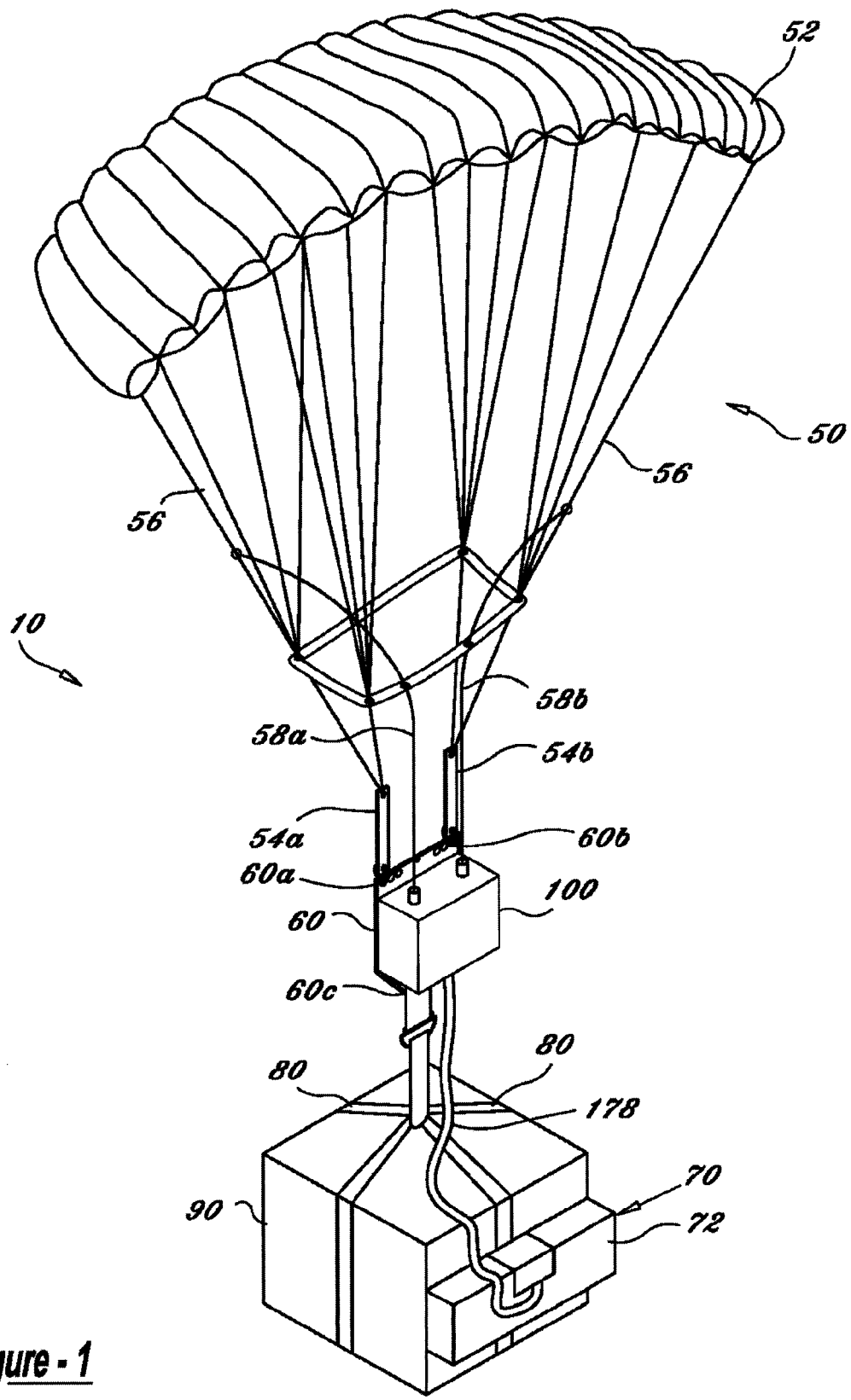
FIG. 1 is a perspective view of the aerial delivery device with the ram-air canopy inflated.

Referring now to FIG. 1 there is seen the invention 10 with the ram-air drogue parachute 50 fully inflated. In a first embodiment, the aerial delivery device 10 generally consists of a ram-air drogue parachute 50, a control box 100, at least one recovery parachute 70, payload and one or more means for retaining/securing the payload 90 such as payload support straps 80. A means for controlling descent orientation such as suspension plate 60, is attached between the drogue 50 and the payload 90. As shown, the suspension plate 60 may be attached to, or part of a control box 100. However, it may be preferred for the control box 100 to serve as the means for controlling descent without reliance upon the suspension plate 60, by means such as those shown below in FIGS. 9 10.

Figure 5:
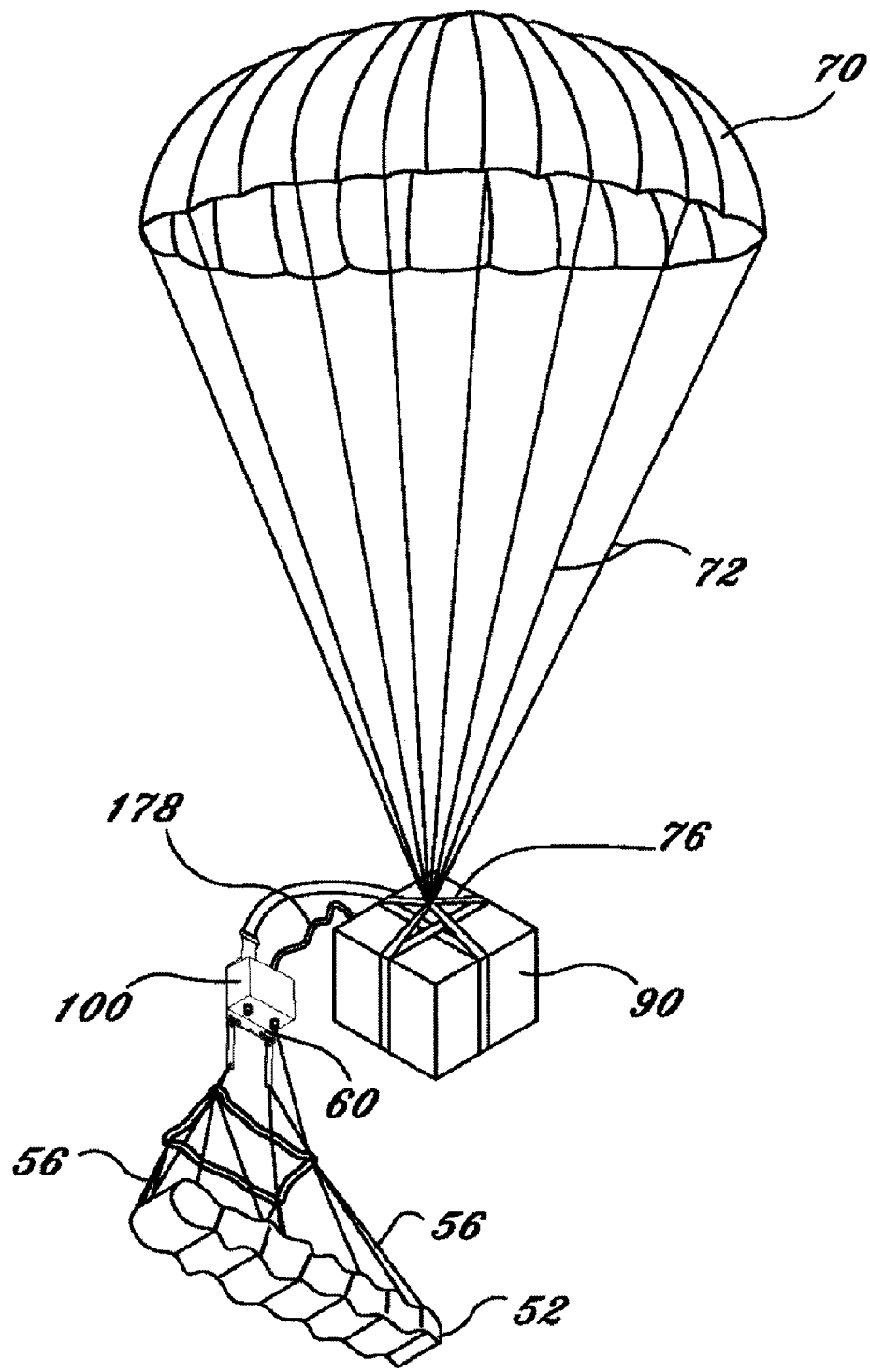
FIG. 5 is a perspective view of an alternative embodiment of the invention illustrating descent under the inflated recovery parachute.

Payload 90 can be safely secured to the bottom of suspension plate 60 at payload suspension point 60c by one or more payload support straps 80. Payload 90 can be attached at a single point or multiple points to suspension plate 60 so that unbalanced payloads do not reduce the maneuverability or usefulness of ram-air drogue parachute 50. Prior to drop-off, recovery parachute 70 is, in one preferred embodiment, contained within a recovery parachute container 72. As shown in FIG. 5, recovery parachute 70 is attached to the payload 90 by parachute riser straps 76 which are connected at the opposite end to suspension lines 72 of recovery parachute 70. Alternatively, recovery parachute 70 may be attached to means for controlling descent orientation such as the control box 100 or the suspension plate 60.

As shown in FIG. 1, ram-air drogue parachute 50 preferably includes ram-air drogue canopy 52, one or more drogue riser straps 54a and 54b, one or more drogue suspension lines 56 and one or more steering lines 58a and 58b. Drogue riser straps 54a and 54b can be attached at drogue attachment points 60a and 60b. Several optional adjacent points may be provided at a location, such as the suspension plate 60, so that the distance between attachment points 60a and 60b may be selected for optimizing performance.

Figure 2:
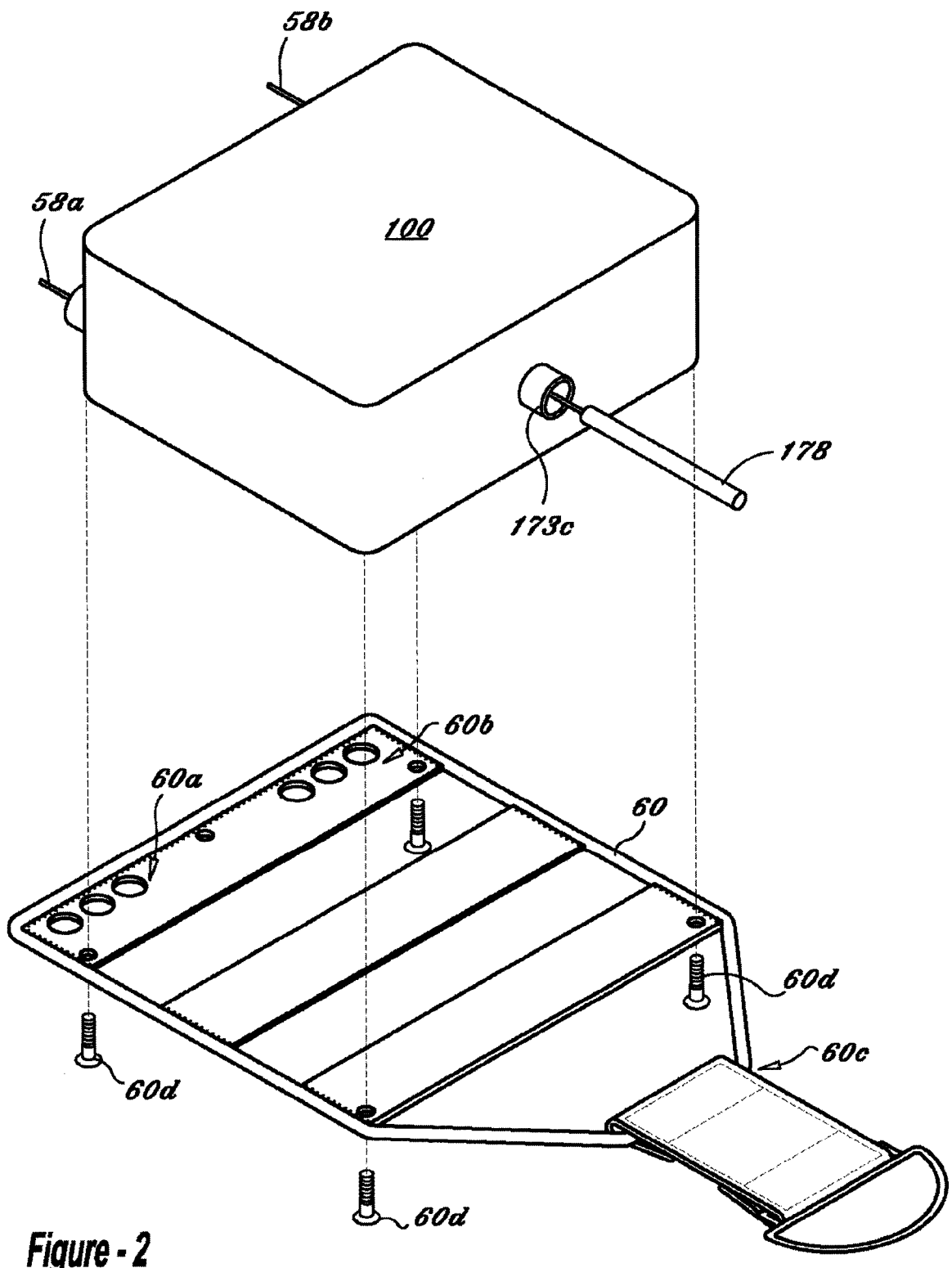
FIG. 2 is an exploded perspective view of the control box and a suspension plate.

A suspension plate is shown in FIG. 2. At least a portion of the suspension plate 60 can be triangularly shaped so that corners of the triangle are formed by drogue attachment points 60a and 60b are on one side of the plate 60 and payload suspension point 60c is on the other side of the plate 60. Although a substantially square shape is shown, equivalent shapes are also contemplated. Also, the drogue attachment points 60a, 60b and the payload suspension point 60c may be attached to the control box 100 itself. Although not shown in this figure, a swivel may be attached between the payload suspension point 60c and the payload 90. By placing drogue attachment points 60a and 60b apart and payload suspension point 60c generally beneath drogue attachment points 60a and 60b, the potential for twisting and tangling drogue riser straps 54a and 54b and/or drogue suspension lines 56 during expansion of the drogue parachute 50 is reduced.

The drogue parachute 50 is preferably a relatively small, highly maneuverable/steerable ram-air gliding type canopy similar to those already in existence but preferably relatively smaller in size than is conventionally used for a particular weight, allowing for the ability to have a higher velocity of descent and forward velocity. Also, the overloaded ram-air drogue parachute 50 is more responsive to steering input via steering lines 58a and 58b and achieves a much higher controlled velocity of descent and forward speed. The specific canopy size of the drogue parachute used is application and performance specific—a higher velocity of descent can be achieved by reducing the size of the canopy which results in reduced time in the air and therefore reduced time to steer and maneuver the payload to the target. The following are suggested ram-air drogue parachute canopy sizes for use with intended cargo weights. However, such is not considered limiting:

Canopy Size Weight of Cargo
about 50 square feet about 300 lbs to about 800 lbs
about 100 square feet about 500 lbs to about 1,000 lbs
about 200 square feet about 1,000 lbs to about 4,000 lbs
about 500 square feet about 2,000 lbs to about 10,000 lbs
about 1,000 square feet about 5,000 lbs to about 12,000 lbs The aerial delivery device 10 can be carried in-flight by an aircraft. When it is desired to drop the device, doors of the aircraft are opened and device 10 is pushed or pulled out of exit doors or dropped from a bay under the aircraft. The aircraft may be provided with alignment tracks, which can be preferably coated with a substance such as TEFLON so that the force needed to push device 10 out of the doors is not excessive. Alignment tracks preferably guide the device 10 straight out of the aircraft. A static lanyard (not shown) can be attached at one end to the aircraft and at the other end to ram-air drogue parachute 50. Prior to deployment, the ram-air drogue parachute 50 can be housed within a container (not shown).

As the device 10 leaves the aircraft, the drogue parachute 50 is deployed by means known in the art, such as a static line lanyard. Alternatively, a round drogue may first deploy from the aircraft and then deploy the drogue parachute 50. On deployment, the round drogue preferably collapses and stays attached can stay at the top of the ram-air drogue. Ram-air drogue parachute 50 reduces the terminal velocity of device 10 and stabilizes attached payload 90 during ram-air drogue fall freefall as seen in FIG. 1. Alternatively, as described below, on ram-air drogue deployment, a brake-cord reefing line stages slider deployment by sequencing brake-cord ties on the reefing line.

Figure 3:
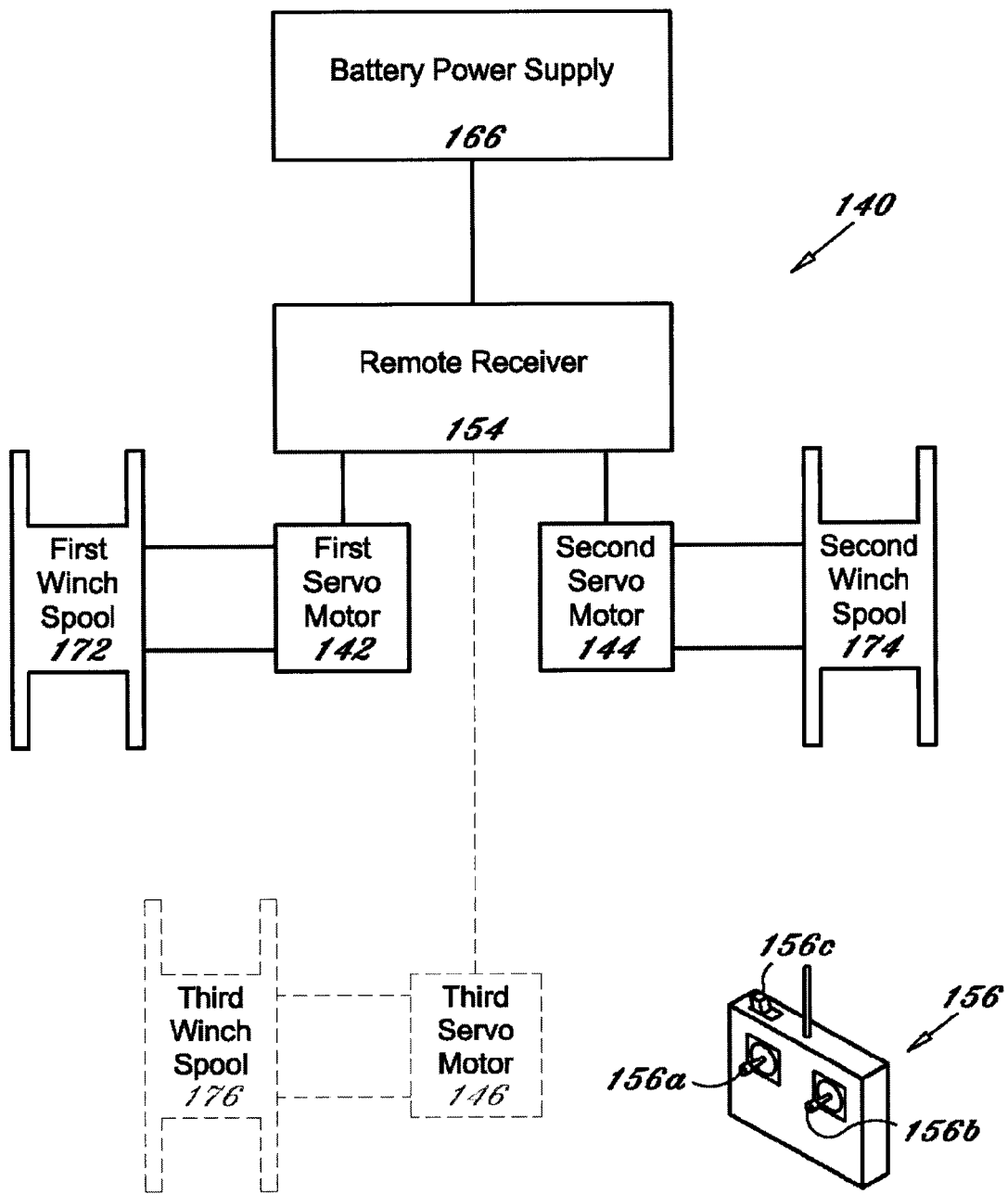
FIG. 3 is a block diagram of a guidance control system in accordance with the present invention.
Figure 4A:
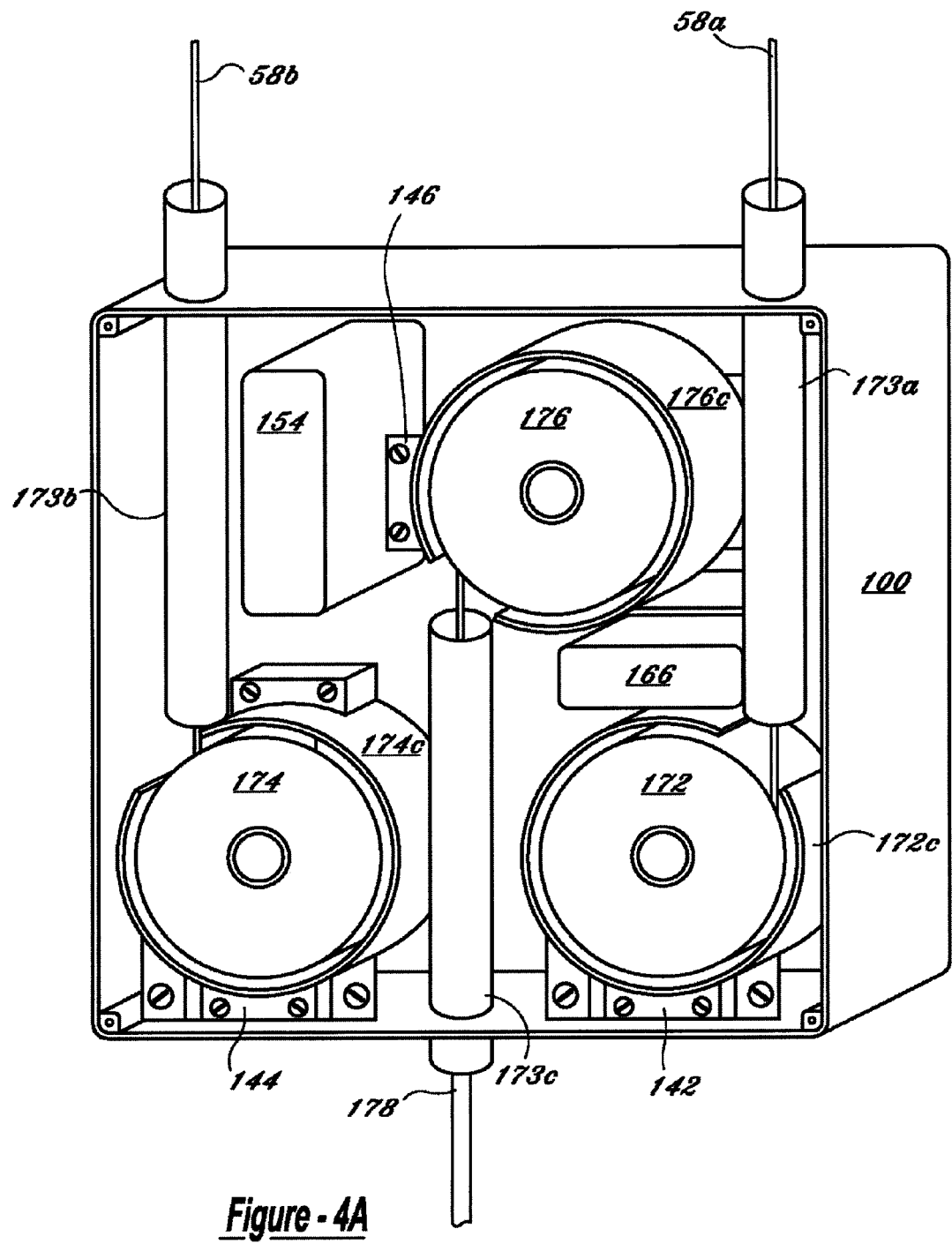
FIG. 4a is a perspective view of an alternative embodiment of the control box having the cover removed.
Figure 4B:
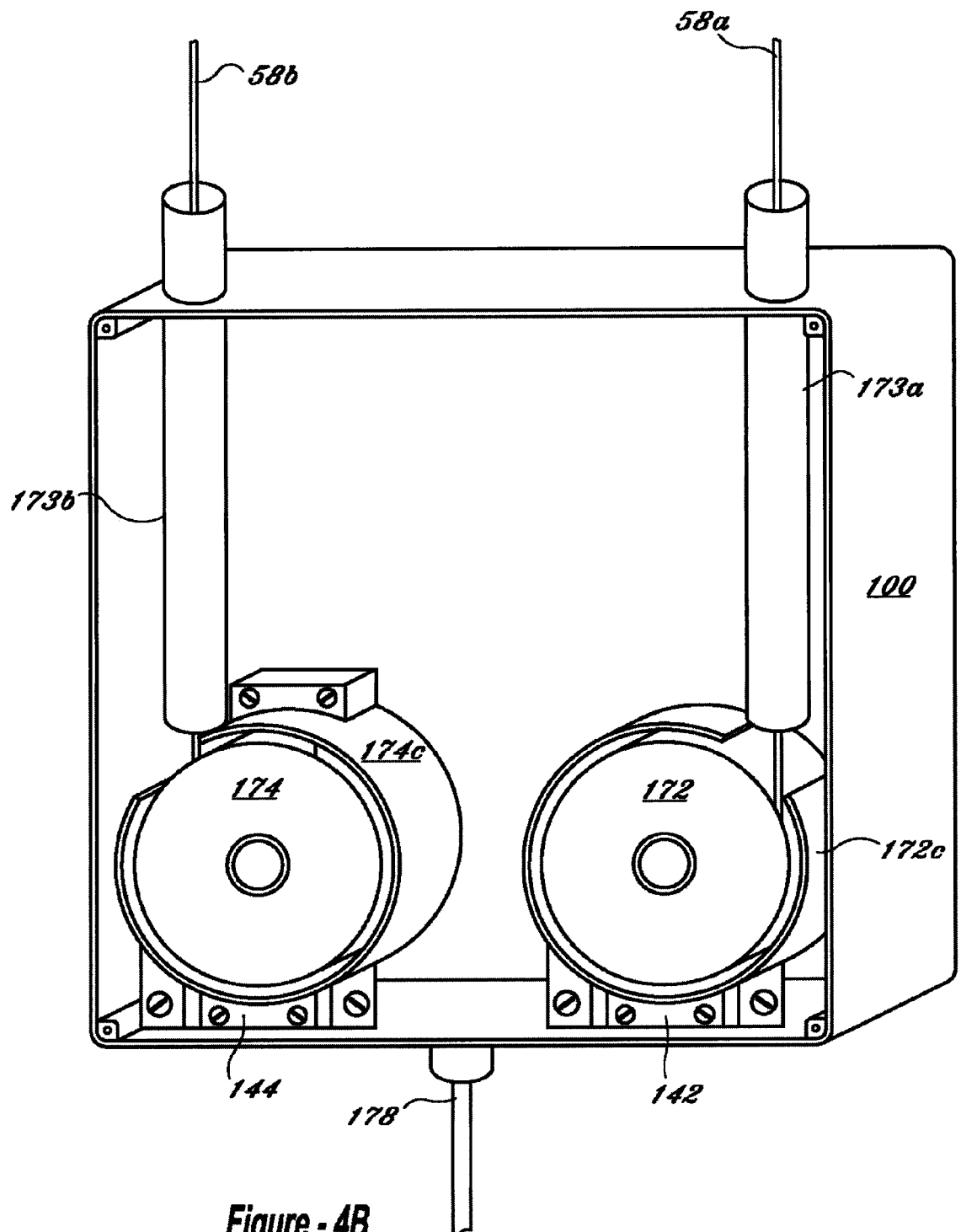
FIG. 4b is a perspective view of another alternative embodiment of the control box having the cover removed.

FIG. 3 illustrates a first embodiment of a guidance control system 140. Guidance control system 140 generally consists of a remote control system including at least one servo motor 142 and a remote receiver 154. A remote control 156 is used to control the descent of the payload 90. A second servo motor 144 and/or a third servo motor may alternatively be used as illustrated in FIGS. 3, 4a & 4b, and be powered by an internal power supply 166. However, it is preferred that only one or two servo motors is used.

At least one servo motor 142, remote receiver 154 and battery power supply 166 is preferably housed within a control box 100 as shown in FIG. 4. Control box 100 can be mounted to suspension plate 60 as seen in FIG. 2 using bolts 60d or other suitable means. The one or more servo motors 142 can be electronically connected to remote receiver 154 which can be powered by battery power supply 166. The one or more servo motors 142 can be mounted within control box 100 using screws, bolts or other known suitable fastening means.

For the embodiment shown in FIG. 4a and FIG. 3, including dashed portions, first, second and third winch spools 172, 174 and 176 are attached to the output shafts of first, second and third servo motors 142, 144 and 146 respectively by a screw or other conventional means. Each winch spool is preferably substantially surrounded by spool covers 172c, 174c and 176c. First, second and third servo motors 142, 144 and 146 are controlled by signals received from remote receiver 154. Depending on the signals received from remote receiver 154, first and second servo motors 142 and 144 turn associated winch spools 172 and 174 either in a clockwise or counterclockwise direction. Steering lines 58a and 58b of ram-air drogue parachute 50 are attached to spools 172 and 174 by conventional means. Steering lines 58a and 58b are preferably fed through guides 173a and 173b which exit through the top of control box 100. Spool covers 172c and 174c contain and direct steering lines 58a and 58b around spools 172 and 174 respectively, preventing twisting and tangling. The movement of spools 172 and 174 by servo motors 142 and 144 cause steering lines 58a and 58b to wind in and/or out. Remote receiver 154 is powered by means such as power supply 166, which preferably provides 6, 12 or 24 volts DC, depending on the use or preference of the operator, (can vary depending on use) to remote receiver 154. These values are not limiting and the amount of power supplied to remote receiver 154 may also vary depending on the remote receiver 154 selected and the power requirements of the servo or servos used.

The embodiment shown in FIG. 4b and FIG. 3 without the dashed portions is the preferred multi-servo embodiment. In it, first and second winch spools 172 and 174 are attached to the output shafts of first and second servo motors 142 and 144 by a screw or other conventional means. Each winch spool is preferably substantially surrounded by spool covers 172c and 174c. First and second servo motors 142 and 144 are controlled by signals received from remote receiver 154. Depending on the signals received from remote receiver 154, first and second servo motors 142 and 144 turns associated winch spools 172 and 174 either in a clockwise or counterclockwise direction. Steering lines 58a and 58b of ram-air drogue parachute 50 are attached to spools 172 and 174 by conventional means. Steering lines 58a and 58b are preferably fed through guides 173a and 173b which exit through the top of control box 100. Spool covers 172c and 174c contain and direct steering lines 58a and 58b around spools 172 and 174 respectively, preventing twisting and tangling. The movement of spools 172 and 174 by servo motors 142 and 144 cause steering lines 58a and 58b to wind in and/or out. Remote receiver 154 is powered by means such as power supply 166, which preferably provides 6, 12 or 24 volts DC, depending on the use or preference of the operator, to remote receiver 154. These values are not limiting and the amount of power supplied to remote receiver 154 may also vary depending on the remote receiver 154 selected and the power requirements of the servo or servos used.

Remote receiver 154 monitors signals being emitted from remote control 156, directing servo motors to turn associated winch spools clockwise or counterclockwise as directed by remote control 156. Preferably the guidance control system is a digital proportional type so that the remote control can control the speed and degree which the servo motor or motors turn. Each servo motor preferably allows 6–8 full rotations (though not considered limiting) so that steering lines 58a and 58b may be adequately controlled.

Remote control 156 allows a user to control the servo or servos preferably by the movement of one or more joysticks 156a, 156b, which in turn cause the movement of servo motors and associated winch spools. Guidance control system 140 allows the invention 10 to be steered and guided towards the intended destination by remote control 156, as steering lines 58a and 58b associated with drogue parachute 50 are connected to winch spools 172 and 174. Thus, the ultimate movement of winch spools by corresponding movement of the joysticks 156a and 156b, causes steering lines 58a and 58b to correspondingly move to guide invention 10 to its destination.

Referring to FIG. 5, at a preselected altitude above the targeted area, recovery parachute 70 is deployed. The altitude selected may be relatively low, depending on the size of the recovery parachute 70 being used and the weight of payload 90, so that payload 90 spends a reduced period of time in the air. The activation of recovery parachute 70 can be achieved by means such as one or more of the following four ways: (a) power voltage through a wire from the receiver to a pyrotechnic cutter on a pilot chute; (b) the ram-air drogue being released from the payload and extracting recovery parachutes(s); (c) remote activation from the receiver to activate the pyrotechnic cutter; and/or (d) automatic activation device activating a pyrotechnic cutter on the payload. Other equivalent ways of activation known in the art are also contemplated.

In the embodiment shown in FIG. 3 (including dashed portion), FIG. 4a and FIG. 5, the recovery parachute 70 is attached via a durable enclosed deployment cable 178 to a third winch spool 176 associated with a third servo 146. Cable 178 is fed through guide 173c to prevent tangling. Spool cover 176c further contains and directs cable 178 around spool 176 preventing twisting and tangling. The deployment sequence of recovery parachute 70 is controlled by switch 156c which preferably operates a separate channel of remote control 156. Upon engaging switch 156c, third winch spool 176 winds in the rip cord of parachute 70 via deployment cable 178 which triggers the deployment and subsequent inflation of recovery parachute 70. Once recovery parachute 70 is fully inflated, ram-air drogue parachute 50 is caused to at least partially collapse, thereby reducing drag so that recovery parachute performance is not hindered. In one of the embodiments for deploying recovery parachute 70 discussed above, deployment is initiated by the release of ram-air drogue parachute 50 which can be attached to recovery parachute 70 by an extraction bridle. Deployment cable 178 can be attached to a cutter which activates a plurality of ring release mechanisms which can be used to attach ram-air drogue parachute 50 to the control box 100 or the suspension plate 60 at drogue attachment points 60a and 60b. Upon engaging switch 156c, third winch spool 176 winds in deployment cable 178 which activates the release of ram-air drogue parachute 50 which pulls recovery parachute 70 out from within its container so that it inflates.

Recovery parachute 70 is preferably the conventional round recovery type parachute used for the delivery of cargo. Since at the time of deployment of recovery parachute 70 aerial delivery device 10 can be traveling at a high velocity, a pilot chute and recovery parachute(s) 70 can be preferably located so that they deploy downwind, thereby being drawn behind payload 90. Otherwise, recovery parachute 70 may be slow in opening, may get tangled or may not open due to the impacting wind velocity. To avoid this, recovery parachute 70 can preferably be attached to the heaviest side of payload 90, or, if payload 90 is balanced, a wind sock may be attached to recovery parachute 70 to assure that it is drawn behind payload 90 while in flight. The size of the canopy of recovery parachute 70 can range from several hundred feet to several thousand feet depending on the weight of the payload 70 and any other performance requirements. If a soft landing is required by the fragility of payload 70 or for other reasons, then multiple recovery parachutes can be used at one time or a larger canopy can be selected. Conversely, if a rapid descent with reduced drift is required a smaller canopy can be selected. The cargo descends the remainder of the distance under recovery parachute 70 generally as shown in FIG. 5.

Figure 6:
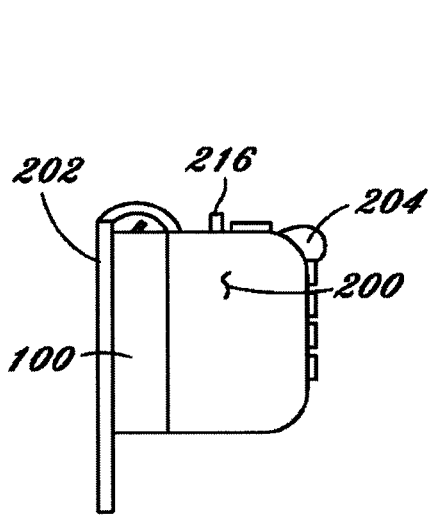
FIG. 6 is a side view of the deployment bag of the invention.
Figure 8:
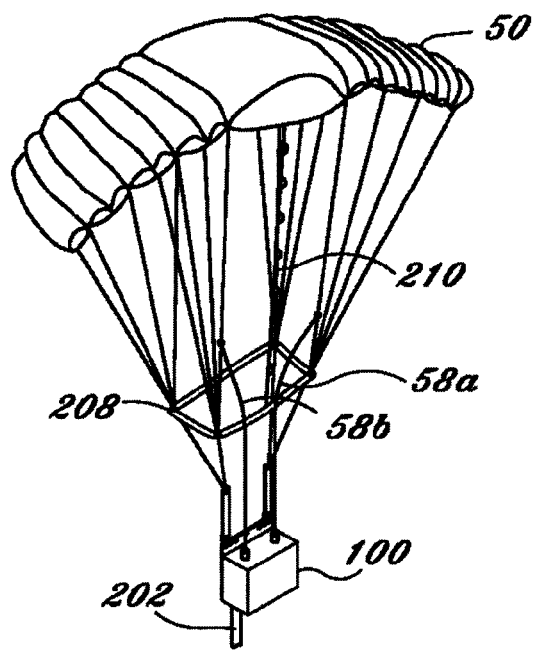
FIG. 8 is a perspective view of the control box and drogue parachute in an alternative embodiment of the invention during deployment of the drogue parachute.

An alternative embodiment is shown in FIGS. 6 8. As shown, before deployment the drogue parachute 50 is placed in a deployment bag 200. The bag may be of any shape, size or material suitable for containing a parachute before deployment. The drogue within the bag 200 preferably is attached to a drogue riser 202 located on or near the control box 100.

Figure 7:
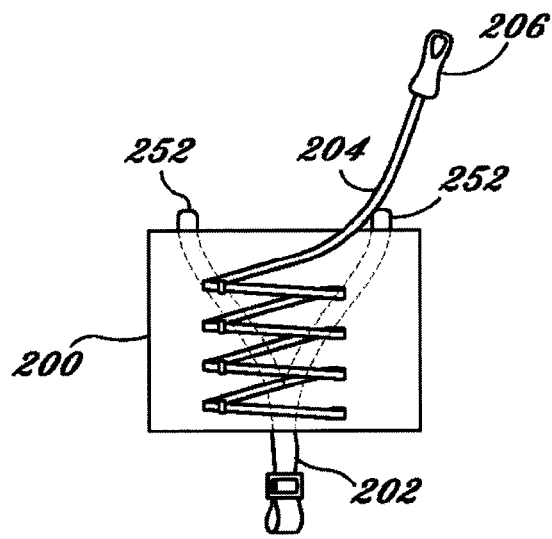
FIG. 7 is a front view of the deployment bag of the invention.

As shown in FIG. 7, the drogue may be removed from the deployment bag 200 by use of a static line 204 and snap 206, or equivalent means.

Figure 9:
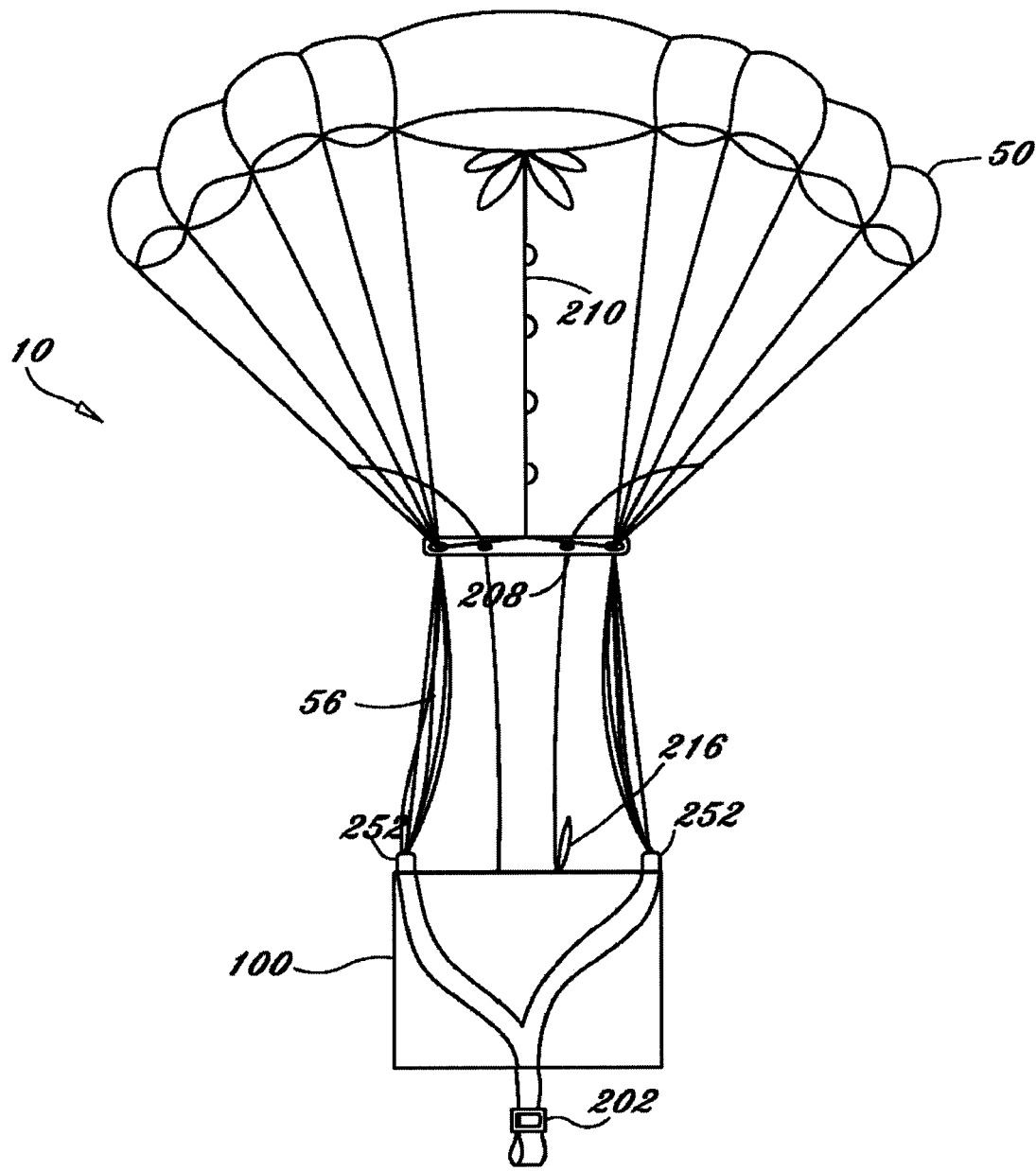
FIG. 9 is a front view of the control box and drogue parachute in an alternative embodiment of the invention during deployment of the drogue parachute.

Separated access points 252 for control lines and/or suspension lines, and the drogue riser 202 are also shown in FIG. 9. FIG. 10 shows an embodiment having additional access points 254 for control lines. The drogue 50 is shown deployed in FIG. 8. In this embodiment, deployment of the drogue 50 is controlled through the use of a slider 208 used in conjunction with brake lines 210. It is preferred that four brake line loops are used; however, that number can be varied.

Other equivalent means for controlling deployment of the drogue are known in the art and are contemplated. The aerial delivery device 10, after it has been dropped from a height and before full deployment of the drogue 50 is shown in FIG. 9. As shown, the slider 208 is not yet in full deployment. The brake line 210 allows the slider 208 to travel down the suspension lines 56 in an incremental fashion. However, other known means in the art for incrementally, or slowly sliding the slider 208 down the control lines 56 are also contemplated. As shown in FIGS. 6 9, a drogue riser 202 is preferably located below the control box 100.

Figure 10A:
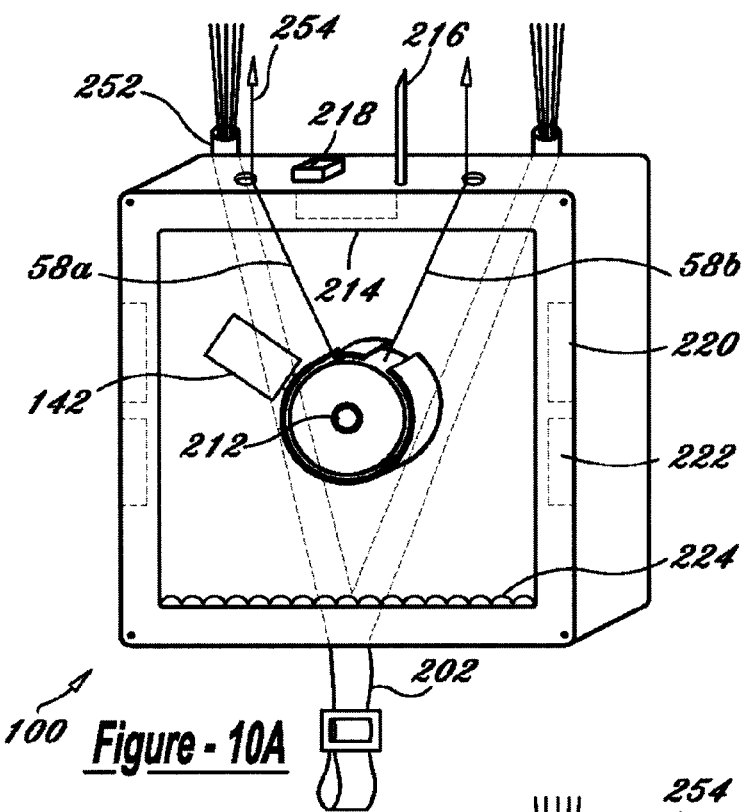
FIG. 10a is a perspective view of the control box of the preferred embodiment of the invention.
Figure 10B:
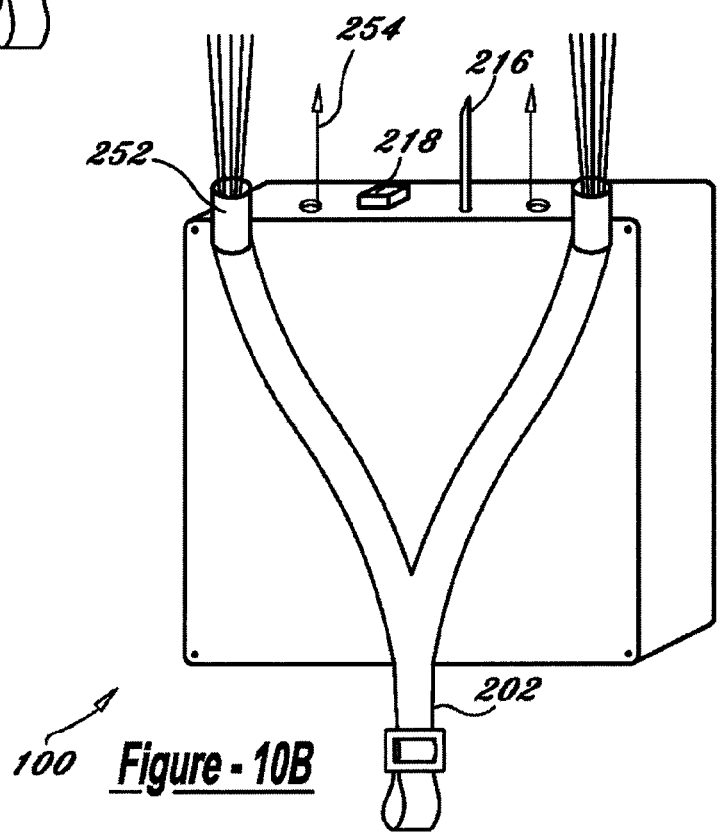
FIG. 10b is a rear view of the control box of the preferred embodiment of the invention.

A preferred embodiment of the means for controlling direction of descent of the drogue parachute using a control box 100 is shown schematically in FIG. 9 and in FIGS. 10a and 10b. As shown, the cover of the control box in FIG. 10a has been removed, and riser 202 is shown behind the control box 100. The left control line 58a and the right control line 58b interact with a single servo motor 142 in connection with a gear box 212.

It is also preferred that riser 202 is attached to the back of the control box, as shown in FIG. 10b. However, other equivalent configurations are also contemplated. In one embodiment, a receiver 214 such as a GPS device or radio receiver is located on the control box 100, and used to control the direction of the descent of the aerial delivery device 10. It may be preferred that the receiver 214 has an activation switch 218 so that a user may engage the receiver 214 at will. Furthermore, antenna 216 may be used to either receive or transmit coordinates for the delivery of the payload. Also, a compass 220 for directing the aerial delivery device may also be attached to the control box 100. Furthermore, a directional gyro 222 may be used to direct the aerial device. It may be preferred that the servo 142 and other electronic devices located on the control box 100 are powered by one or more power supplies such as batteries 224 located within the control box 100, generally as shown.

Figure 11:
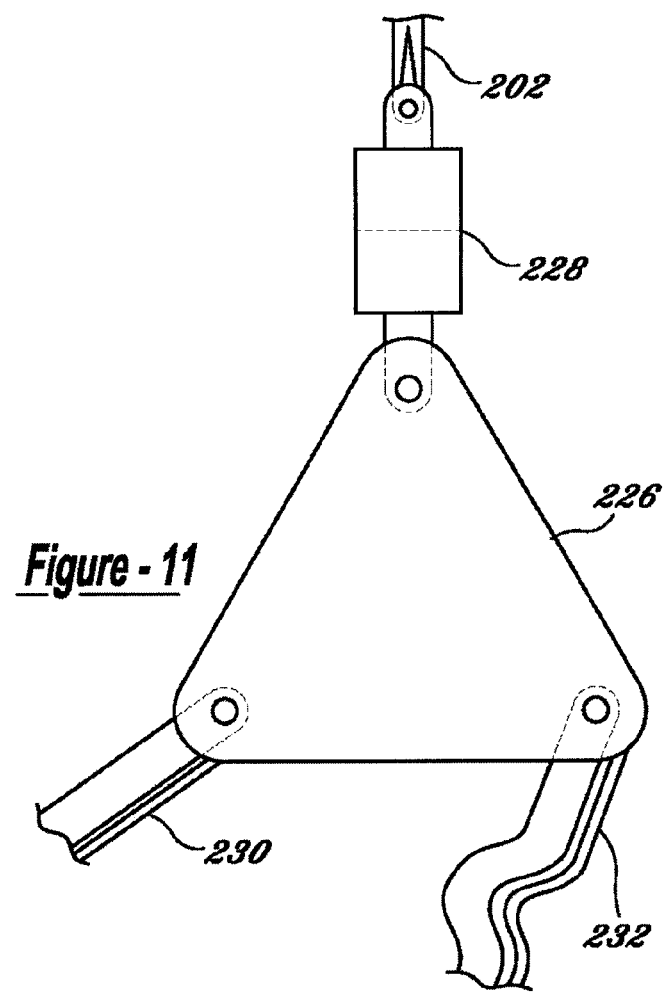
FIG. 11 is a side view of the polygonal link of the preferred embodiment of the invention.

As shown in FIG. 11, it may also be preferred that the drogue riser 202 is attached to a means for separating attachment points, such as polygonal link 226. As shown, it is preferred that the riser 202 is connected to the polygonal link 226 with a means for reducing the risk of tangling, such as a swivel 228.

Furthermore, it is preferred that payload riser 230 and recover parachute riser 232 are separated on the link 226. The distances between the ram riser 202, the payload 230 and the recovery riser 232 prevent tangling and mishap between the drogue, the recovery parachute and the payload. A triangle shaped link 226 is illustrated in FIG. 11 and is preferred; however, other shapes may be used, such as square and rectangular, and are contemplated herein.

Figure 12:
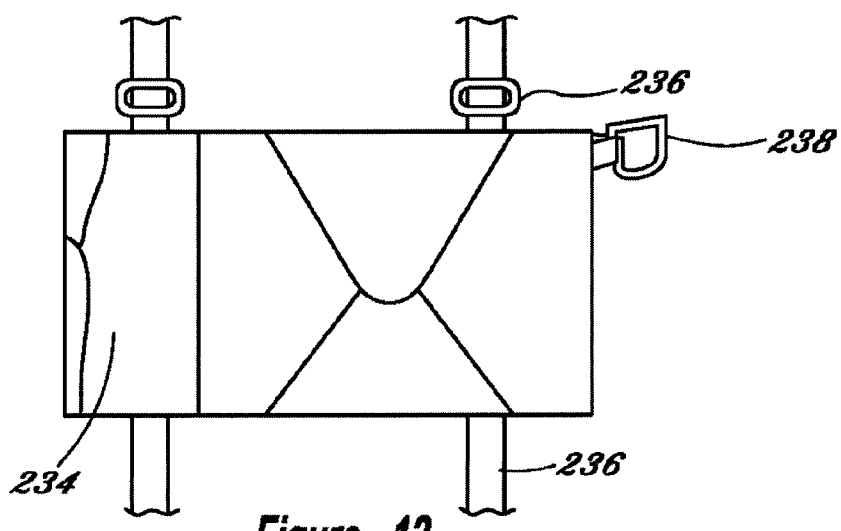
FIG. 12 is a perspective view of the recovery parachute activation system of an alternative embodiment of the invention.
Figure 13:
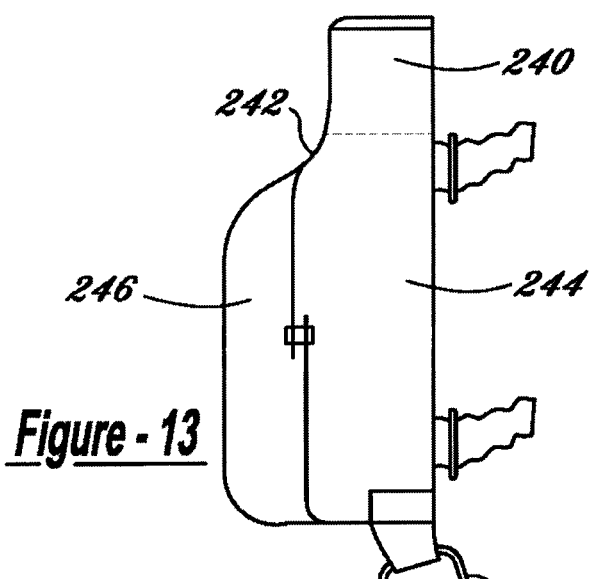
FIG. 13 is a side view of the recovery parachute activation system of an alternative embodiment of the invention.

The recovery parachute activation system of the aerial delivery device is shown in FIGS. 12 and 13. An automatic device or activation sensor is placed within a container 234. It may be preferred that the container 234 further includes attachment straps 236 for attachment to the payload. The activation system is then attached to the recovery parachute, preferably by means such as a bridle 238. However, other equivalent means for attachment are also contemplated herein. As shown in FIG. 13, the automatic activation device may be in a separate compartment 242 of a container, having multiple purposes. The container 242 may also have a compartment for the drogue parachute 244 and a separate compartment 246 for a pilot chute for the drogue parachute.

Figure 14:
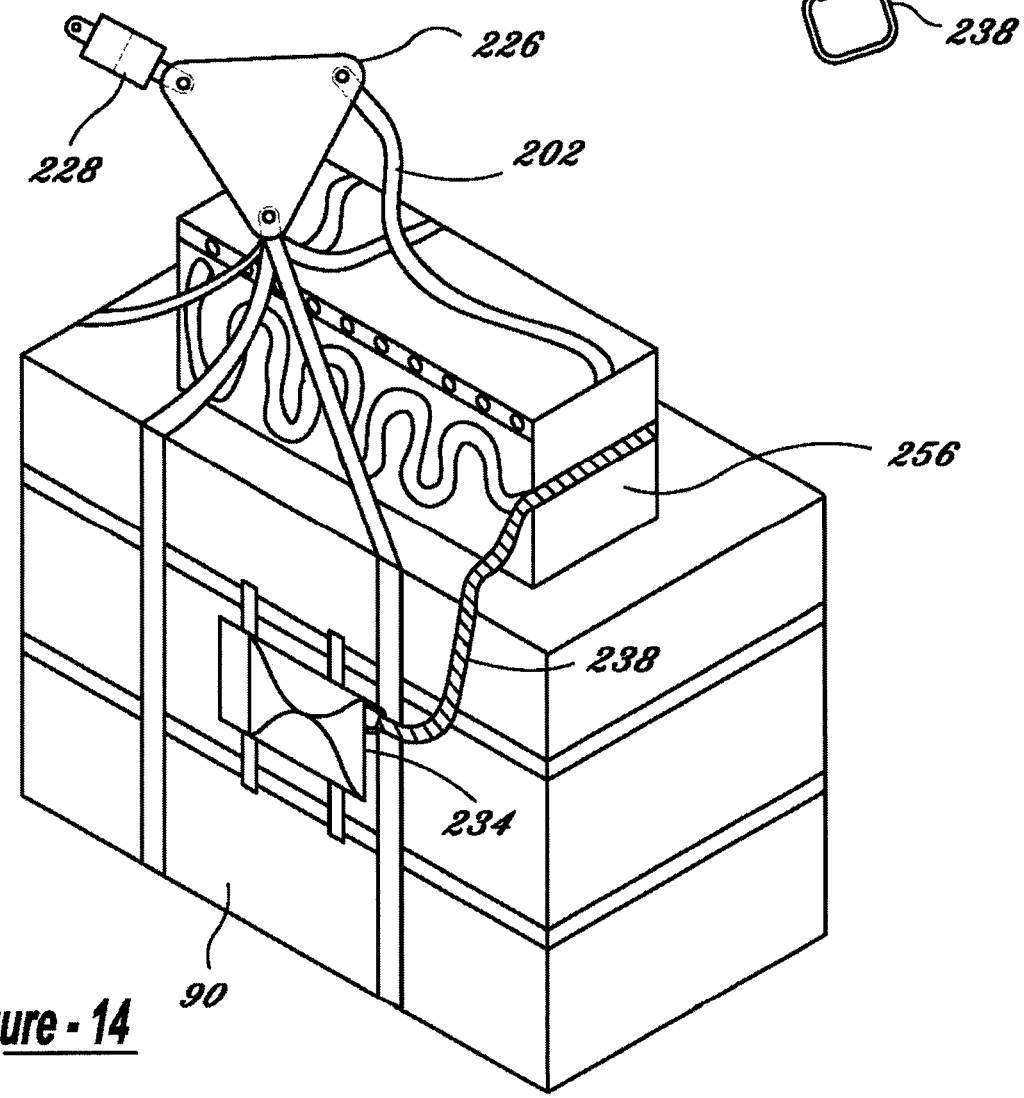
FIG. 14 is a perspective view of the recovery parachute activation system and payload.

An illustration of the preferred embodiment of the recovery system before deployment is shown in FIG. 14. The polygonal link 226 is shown having the swivel 228 for the drogue (not shown). The link 226 is also attached to the recovery parachute riser 202, which is connected to the recovery parachute 70 located within a container 256. The recovery parachute 70 is attached by bridle 238 to the recovery parachute activation system container 234. Thus, connection between the drogue parachute recovery parachute and cargo are spaced sufficiently apart for safe deployment.

Figure 15:
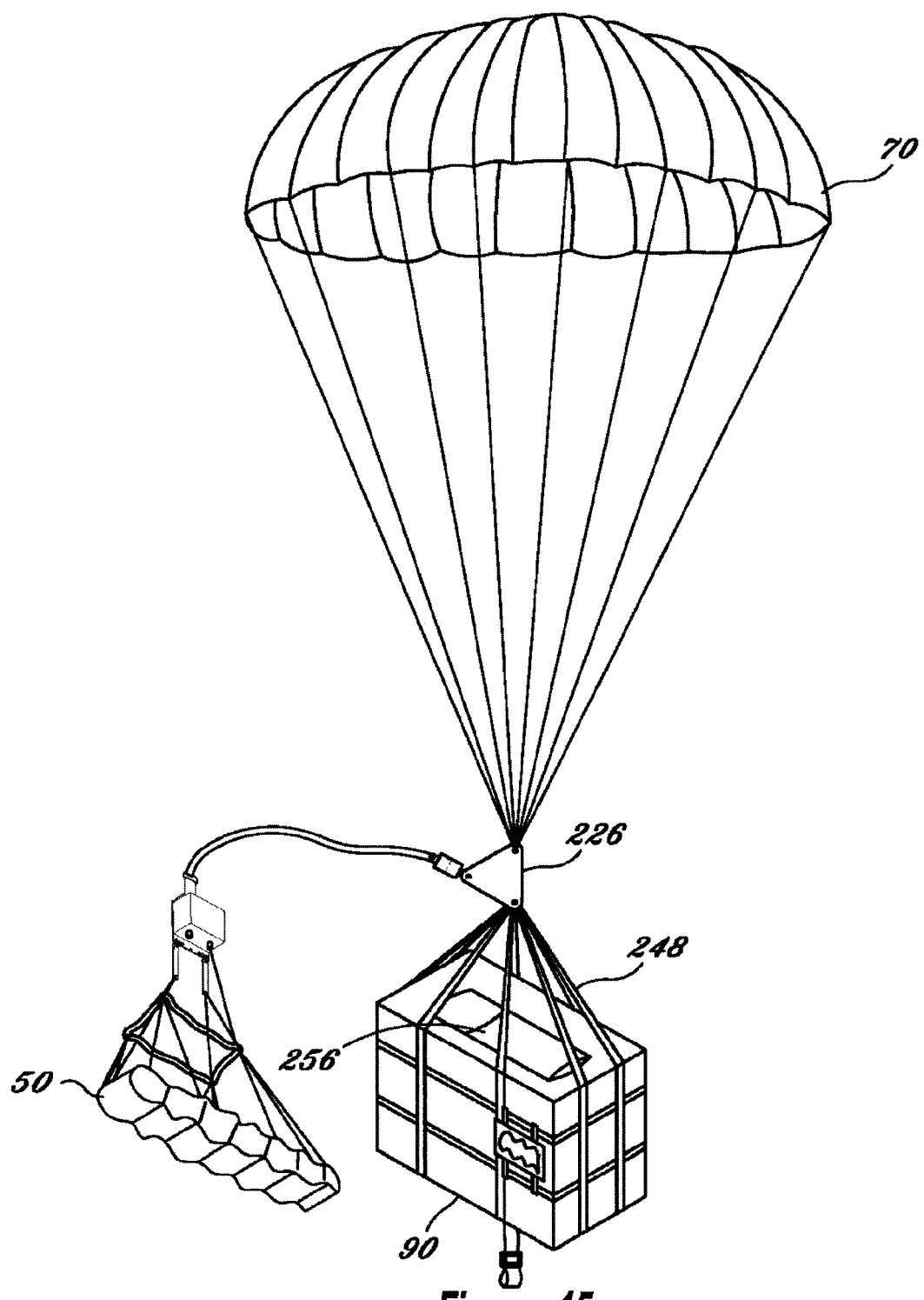
FIG. 15 is a perspective view of the preferred embodiment of the invention during deployment of the recovery parachute.

Deployment of the recovery parachute 70 for this embodiment is illustrated in FIG. 15. As shown, the polygonal link 226 is an attachment to the recovery parachute 70, the drogue parachute 50, and the payload 90. It may be preferred that the attachment is made by a cargo harness 248. As shown, when the recovery parachute 70 deploys, the drogue parachute 50 becomes deflated. Because of the separating link between the drogue parachute and the recovery parachute, there is a decreased chance of the parachutes becoming tangled. Furthermore, the container for the recovery parachute 250 may be firmly attached to the cargo 90 for reuse.

It may be preferred that the bridle attaching the recovery parachute activation system to the recovery parachute 250 may include a cutter so that the recovery parachute may deploy without altering the descent of the payload.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An aerial delivery device capable of delivering a payload, comprising:
    an overloaded ram-air drogue parachute;
    a descent control system, to which said overloaded ram-air drogue parachute is connected, for steering said overloaded ram-air drogue parachute;
        wherein the descent control system includes a suspension plate with one or more suspension straps attached to said suspension plate for engaging the payload, said payload being suspended below said suspension plate and descent control system prior to the deployment of the recovery parachute; and
    one or more recovery parachutes.

2. The aerial delivery device of claim 1, wherein the suspension plate is in mechanical connection with and is a part of a control box, said suspension plate being connected to the overloaded ram-air drogue parachute by one or more suspension lines.

3. The aerial delivery device of claim 2, wherein two of said suspension plate includes drogue parachute attachment points and at least one payload suspension point spaced apart from said drogue parachute suspension point.

4. The aerial delivery device of claim 3, wherein said drogue parachute is attached to drogue riser straps attached to said drogue parachute attachment points and wherein said payload is attached to payload straps attached to said payload suspension point.

5. The aerial delivery device of claim 4, wherein said drogue riser straps are attached to said drogue attachment points by ring release mechanisms activated by a cutter.

6. The aerial delivery device of claim 1, wherein, prior to extraction and deployment, said recovery parachute is contained within a recovery parachute container attached to said payload.

7. The aerial delivery device of claim 1 wherein said descent control system includes a link located between the payload, the drogue parachute and the recovery parachute.

8. The aerial delivery device of claim 7, wherein said link is polygonal.

9. The aerial delivery device of claim 8, wherein the link is triangular.

10. The aerial delivery device of claim 9, further comprising a means for reducing the risk of tangling between the link and the drogue parachute.

11. The aerial delivery device of claim 1, wherein said descent control system includes at least one servo motor.

12. The aerial delivery device of claim 1, wherein said descent control system comprises a signal receiver in electronic connection with at least one servo motor.

13. The aerial delivery device of claim 12, wherein at least one servo motor is controlled via one or more joysticks on a remote control.

14. The aerial delivery device of claim 12, wherein said receiver is adapted to receive signals from a remote control, and said remote receiver is adapted to direct said servo motor.

15. The aerial delivery device of claim 1, further comprising means for activating said recovery parachute.

16. The aerial delivery device of claim 1, wherein said payload is attached to said overloaded ram-air drogue parachute by a swivel and one or more parachute riser straps that connect to one or more suspension lines, said suspension lines being directly connected to said overloaded ram-air drogue parachute.

17. The aerial delivery device of claim 1, wherein said aerial delivery device is interfaced with a global positioning system for autonomous navigation of said payload.

18. The aerial delivery device of claim 1, further comprising a means for activating and controlling the deployment of the recovery parachute.

19. The aerial delivery device of claim 1, wherein the means for controlling includes a slider.

20. The aerial delivery device of claim 19, wherein the means for controlling further includes one or more brake lines.

* * * * *